(12) United States Patent
White et al.

(10) Patent No.: US 9,371,197 B2
(45) Date of Patent: Jun. 21, 2016

(54) SYSTEMS AND PROCESSES FOR STORING RESIN

(71) Applicant: Univation Technologies, LLC, Houston, TX (US)

(72) Inventors: Simon J. White, Katy, TX (US); Alison H. Hasbargen, Lake Geneva, WI (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 14/426,611

(22) PCT Filed: Oct. 1, 2013

(86) PCT No.: PCT/US2013/062838
§ 371 (c)(1),
(2) Date: Mar. 6, 2015

(87) PCT Pub. No.: WO2014/055497
PCT Pub. Date: Apr. 10, 2014

(65) Prior Publication Data
US 2015/0217949 A1    Aug. 6, 2015

Related U.S. Application Data

(60) Provisional application No. 61/708,354, filed on Oct. 1, 2012.

(51) Int. Cl.
| | | |
|---|---|---|
| *C08F 210/00* | (2006.01) | |
| *F16L 53/00* | (2006.01) | |
| *B65G 53/00* | (2006.01) | |
| *B65G 53/16* | (2006.01) | |
| *B01J 8/18* | (2006.01) | |
| *B01J 8/00* | (2006.01) | |
| *C08F 2/34* | (2006.01) | |
| *C08F 10/00* | (2006.01) | |

(52) U.S. Cl.
CPC ............... *B65G 53/16* (2013.01); *B01J 8/0015* (2013.01); *B01J 8/0025* (2013.01); *B01J 8/1809* (2013.01); *C08F 2/34* (2013.01); *C08F 10/00* (2013.01); *B01J 2208/00212* (2013.01); *Y10T 137/6579* (2015.04)

(58) Field of Classification Search
CPC ...... B01J 8/1809; B01J 8/0015; B01J 8/0025; B01J 2208/00212; C08F 10/00; C08F 2/34; B65G 53/16; Y10T 137/6579
USPC ........................... 526/348; 137/340; 406/197
See application file for complete search history.

(56) References Cited

U.S. PATENT DOCUMENTS

| | | |
|---|---|---|
| 4,666,998 A | 5/1987 | Hagerty |
| 5,276,113 A | 1/1994 | Hashiguchi et al. |
| 6,838,532 B2 | 1/2005 | Veariel et al. |
| 7,223,714 B2 | 5/2007 | Beech, Jr. et al. |
| 2006/0094593 A1 | 5/2006 | Beech, Jr. et al. |

FOREIGN PATENT DOCUMENTS

| | | | |
|---|---|---|---|
| WO | WO 2011/085937 | * | 1/2011 |
| WO | WO 2011/085937 | | 7/2011 |

* cited by examiner

*Primary Examiner* — William Cheung
(74) *Attorney, Agent, or Firm* — Brooks, Cameron & Huebsch, PLLC

(57) ABSTRACT

Improved systems and processes for storing resins are disclosed herein. These systems and processes are especially useful for reducing the tendency of resins to sinter. In polymerization processes, the improvements disclosed herein can reduce the tendency of resins to sinter while also allowing downstream operations to continue.

17 Claims, 3 Drawing Sheets

SYSTEMS AND PROCESSES FOR STORING RESIN

CROSS-REFERENCE TO RELATED APPLICATIONS

This application is a National Stage application under 35 U.S.C. §371 of International Application No. PCT/US2013/062838, filed Oct. 1, 2013, that claims the benefit of Ser. No. 61/708,354, filed Oct. 1, 2012, the disclosures of which are incorporated by reference in their entireties.

BACKGROUND

Advances in polymerization and catalysts have produced polymer resins having improved physical and mechanical properties useful in a wide variety of products and applications. With the development of new catalysts, choices in polymerization processes, such as solution, slurry, high pressure, or gas phase, for producing a particular polymer have been greatly expanded. Advances in polymerization technology have also provided more efficient, highly productive, and economically enhanced processes.

Gas-phase polymerization processes are well known in the art. Such processes can be conducted, for example, by introducing the gaseous monomer or monomers into a stirred and/or fluidized bed of resin particles and catalyst. In fluidized-bed polymerization of olefins, the polymerization is conducted in a fluidized-bed reactor, wherein a bed of resin particles is maintained in a fluidized state by means of a gas stream including gaseous reaction monomer. The polymerization of olefins in a stirred-bed reactor differs from polymerization in a fluidized-bed reactor by the action of a mechanical stirrer within the reaction zone, which contributes to fluidization of the resin bed. As used herein, the term "gas-phase reactor" will include fluidized-bed and stirred-bed reactors.

The start-up of a gas-phase reactor generally uses a bed of pre-formed particles of polymer resin, known as a "seedbed." After polymerization is initiated, the seedbed is sometimes referred to as a "reactor bed." The reactor bed includes a bed of resin particles, catalyst(s), reactants and inert gases. This reaction mixture is maintained in a fluidized condition by the continuous upward flow of a fluidizing gas stream from the base of the reactor which includes recycle gas stream circulated from the top of the reactor, together with added make-up reactants and inert gases. A distributor plate is typically positioned in the lower portion of the reactor to help distribute the fluidizing gas to the reactor bed, and also to act as a support for the reactor bed when the supply of recycle gas is cut off. As fresh polymer resin is produced, polymer resin is withdrawn to substantially maintain the height of the reactor bed. Resin withdrawal is generally via one or more discharge outlets disposed in the lower portion of the reactor, near the distributor plate. The polymer resin withdrawn from the gas-phase reactor can be transferred into a product purge vessel. The polymer resin, for example, in the form of a polymer powder, may then be transferred out of the product purge vessel to downstream operations, which may include extrusion or packaging operations.

In normal operations, the polymer resin can intermittently be transferred from the product purge vessel to a seedbed container instead of to downstream operations. In some instances, a side stream of the polymer resin may be transferred to the seedbed container while continuing transfer to the downstream operations, thus allowing continued extrusion operations, for example. In the seedbed container, the polymer resin may be stored for subsequent use, for example, as a seedbed for reactor start-up. When needed, the polymer resin may be transferred from the seedbed container to the reactor. It is typically desired to have storage containers with stored polymer resins therein for each polymer resin that is to be made in the polymerization operations.

A conventional design of a seedbed storage system involves a closed-loop, pneumatic conveying system that does not allow for the polymer resin to be cooled during transfer to the seedbed container. Because the polymer resin is transferred at elevated temperatures (e.g., about 60° C. to about 110° C.), the resin may sinter if allowed to accumulate in the seedbed container without cooling and/or further circulation. The high solids to conveying fluid ratios in conventional conveying systems effect some cooling but do not achieve sufficient cooling to avoid sintering.

Accordingly, to avoid sintering, a cooling/recirculation step may be carried out after the transfer. The time before sintering occurs depends on resin properties, especially density, and can vary from a long time to almost no time. Thus, depending on the resin, there may not be adequate time to complete the transfer before sintering may occur. For example, there is a maximum transfer time of three hours for certain polymer resins before a cooling/recirculation step should be performed or the polymer resin in the seedbed container may sinter. Thus, the downstream operations, such as extrusion, typically must be shutdown and the full polymer resin stream typically must be transferred to the seedbed container so that the transfer to the seedbed container can be completed quickly enough to begin the cooling/recirculation step prior to sintering. Drawbacks to this approach include loss of operating continuity for the downstream operations and the risk of off-grade resin production.

Alternatively, the seedbed storage system may include two dilute-phase conveying systems. For example, the polymer resin may be transferred to the seedbed container using a conveying system while another conveying system re-circulates/cools the polymer product stored in the seedbed container. However, while this approach may allow transfer to the seedbed container while downstream operations, such as extrusion, are continued by transferring only a side stream of the polymer product, the expense and complexity associated with adding a second conveying system make this approach undesirable.

Accordingly, there exists a need for improved systems and processes for resin storage, such systems and processes capable of reducing the tendency for sintering while allowing for downstream operations to continue.

SUMMARY

Improved systems and processes for storing resins are disclosed herein. These systems and processes are especially useful for reducing the tendency of resins to sinter. In polymerization processes, the improvements disclosed herein can reduce the tendency of resins to sinter while also allowing downstream operations to continue.

Disclosed herein is a process for storing resin, comprising:
a. transferring resin into a container via a flow line using a carrier fluid, wherein the carrier fluid comprises an inert gas; and
b. re-circulating at least a portion of the resin in the container by withdrawing resin from the container and feeding the withdrawn resin into the flow line, wherein the re-circulating occurs simultaneously with the transferring.

Also disclosed herein is a resin storage system comprising:
a. a container;
b. a resin surge vessel in fluid communication with the container; and
c. a control system configured to send signals to cause transfer of resin from the resin surge vessel to the container and simultaneously re-circulate at least a portion of the resin in the container;
wherein the transfer of resin and the re-circulating of resin use a common flow line.

The process for storing resin and the resin storage system disclosed above are useful in many applications. For example, in a polymerization process comprising polymerizing an olefin in a reactor in the presence of a catalyst to produce a polymer resin, at least a portion of the resin produced may be stored according to the process for storing resin and/or using the resin storage system disclosed above.

BRIEF DESCRIPTION OF THE DRAWINGS

These drawings illustrate certain embodiments of the invention. They are not intended to and should not be used to limit or define the invention.

DETAILED DESCRIPTION

Figure 1:
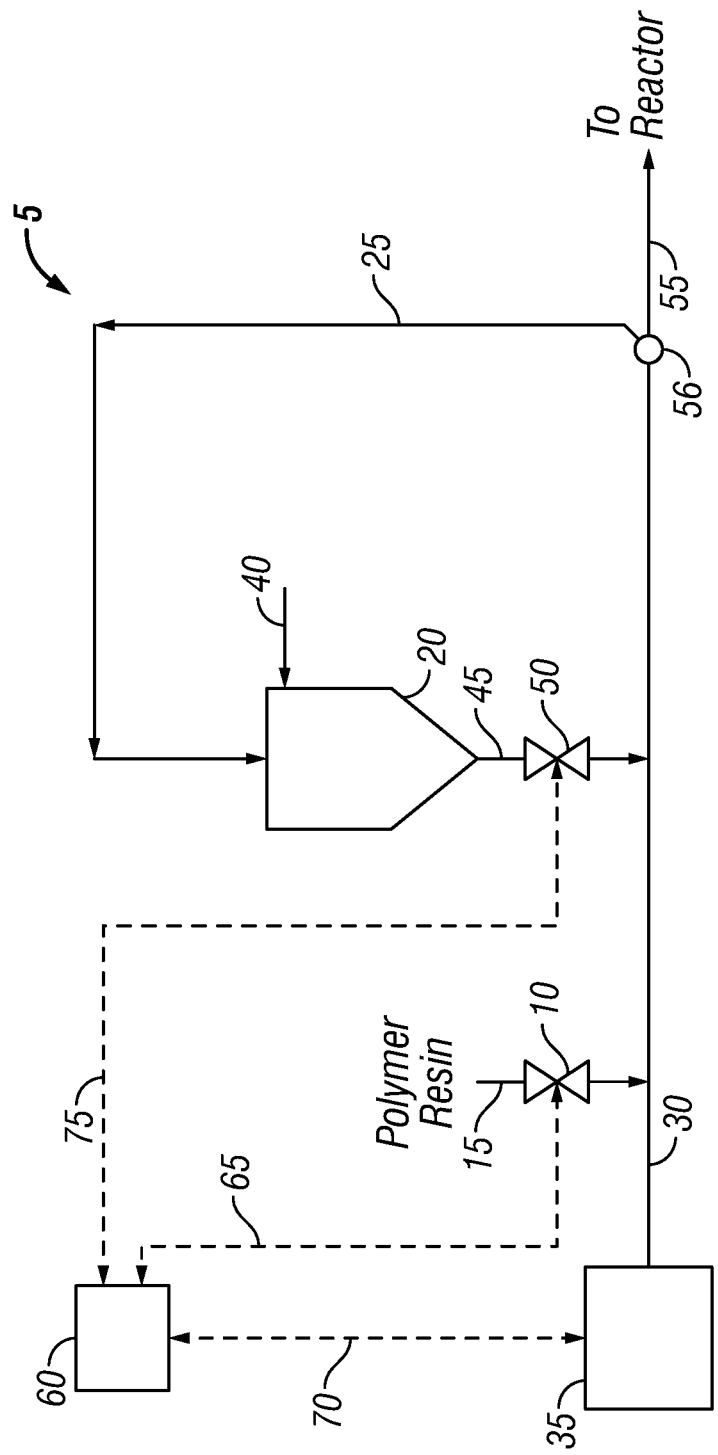
FIG. 1 is a schematic diagram illustrating an example of a seedbed storage system.

Unless otherwise indicated, this invention is not limited to specific compounds, components, compositions, reactants, reactors, reaction conditions, ligands, metallocene structures, or the like, as such may vary. The terminology used herein is for the purpose of describing particular embodiments only and is not intended to be limiting.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The systems and processes disclosed herein are useful generally for reducing the tendency of resins to sinter. One of ordinary skill in the art will recognize that these systems and processes may be usefully applied to many processes where the resins involved have the potential to sinter. The systems and processes are described below with respect to seedbed storage systems in polymerization processes to demonstrate their usefulness with respect to this application, but such description should not be understood to be limiting.

Seedbed Storage Systems

The systems and processes described herein enable simultaneous recirculation and transfer of seedbed resin. Polymer resin may be introduced into a flow line for transfer to a seedbed container. A carrier fluid may be used as a carrier to transfer the polymer resin in the flow line to the seedbed container. While the polymer resin is being transferred to the seedbed container via the flow line, polymer resin from the seedbed container may also be introduced into the flow line and re-circulated back to the seedbed container. The polymer resin will cool during transfer and re-circulation due to heat transfer, for example, with the carrier fluid. In this manner, the polymer resin transferred to the seedbed container should re-circulate and cool as the seedbed container is filled. Accordingly, potential problems associated with sintering of the polymer resin during transfer to the seedbed container may be minimized or even eliminated.

With the potential problems associated with sintering minimized, there is increased flexibility in the transfer of polymer resin to the seedbed containers. For example, the seedbed container may be slowly filled such as by a side stream of the polymer resin while continuing transfer to the downstream operations, thus allowing continued extrusion operations. Moreover, in some instances, the seedbed container may be sized to provide surge capacity, for example, in the event of the shutdown of downstream operations. Because embodiments include use of the same conveying system for transfer and re-circulation, up to several hours of surge capacity may be provided without additional capital cost for cooling of the polymer resin to prevent sintering. In addition, by providing surge capacity in the seedbed container, the size of the product purge vessel may be reduced by reducing or even eliminating surge capacity from this bin, thus potentially reducing the height and cost of the product purge vessel.

As will be discussed in more detail below, the polymer resin may be conveyed to the seedbed container from a polymerization reactor. One or more vessels may be positioned between the seedbed container and the polymerization reactor, such as a product purge vessel and resin surge vessel. The polymer resin from the reactor may be at a temperature in a range of from about 60° C. to about 110° C., or from about 70° C. to about 80° C. The polymer resin should cool as it is transferred from the polymerization reactor to the seedbed container. However, the polymer resin is typically at a temperature, generally >60° C., upon first reaching the seedbed container such that sintering may still be a problem. The resin must typically be cooled to about 50° C. or below to avoid sintering during storage. Accordingly, further cooling may be necessary as described previously.

The transfer of the polymer resin to the seedbed container may be accomplished using any suitable technique. In some embodiments, a pneumatic conveying system may be used in which an inert gas, such as nitrogen, may be used to transfer the polymer resin to the seedbed. The pneumatic conveying system may be a dense-phase system having, for example, a solids/gas mass ratio of greater than about 15:1. A dilute-phase system may also be used, where the dilute-phase system delivers polymer resin to the reactor in excess of the reactor pressure during filling. The dilute-phase system may have, for example, a solids/gas mass ratio in a range of from about 1:1 to about 10:1. The carrier gas velocity at the pick-up point for the dilute-phase system may be in the range of from about 15 to about 40 meters/second and, alternatively, from about 25 to about 30 meters/second. A dilute-phase vacuum system may also be used.

As previously mentioned, at least a portion of the polymer resin in the seedbed container may be recirculated during transfer of the polymer resin to the seedbed container. This may include introduction of at least a portion of the polymer resin from the seedbed container into the flow line to re-circulate the polymer resin back to the seedbed container. The weight ratio of re-circulated polymer resin to transferred polymer resin in the flow line may range from about 1:10 to about 20:1, or from about 1:10 to about 10:1, or from about 1:1 to about 5:1. The re-circulation may be continued even after the desired amount of polymer resin has been transferred to the seedbed container. The re-circulation may be continued, for example, until the polymer resin has been sufficiently cooled to prevent sintering. The polymer resin may be re-circulated until the polymer is at a temperature of about 50° C. or less, for example.

The seedbed container may be any suitable container for storing the polymer resin. The seedbed container may include a storage bin capable of being sealed to be airtight or hopper cars. The polymer resin may be stored in the seedbed container under a blanket or purge of inert gas to maintain the polymer resin substantially free of contaminants. The seedbed container may be open-loop or closed-loop with respect to the blanket or purge of inert gas. The seedbed container may be sized to provide surge capacity. For example, in the event of the shutdown of downstream operations, the full volume of polymer resin produced by the reactor may be directed to the seedbed container rather than requiring reactor shutdown. The seedbed container may be sized to provide one or more hours of surge capacity. For example, the seedbed container may be sized to provide at least about 2 hours of surge capacity, at least about 3 hours of surge capacity, or in the range of about 2 to about 3 hours of surge capacity.

FIG. 1 illustrates an example embodiment of a seedbed storage system 5. As illustrated, polymer resin may be fed to valve 10 via flow line 15, such as from a resin purge vessel or surge vessel (not shown). The valve 10 may provide a continuous supply of the polymer resin or it may operate intermittently, thus providing a non-uniform feed of the polymer resin. The valve 10 may be, for example, a rotary valve, a screw feeder, a belt feeder, a vibrating feeder, or any other suitable mechanism. From the valve 10, the polymer resin may be transferred to the seedbed container 20 via flow line 25. The polymer resin may be transferred to the seedbed container 20 using a carrier fluid comprising an inert gas, such as nitrogen. The carrier fluid may be supplied via flow line 30 from pneumatic conveying equipment 35, which may include a blower, for example. The polymer resin may be stored in the seedbed container 20, for example, under a blanket or purge of inert gas, such as nitrogen, which may be supplied via inert gas line 40 (shown as a blanket). Cooling jackets or another cooling mechanism may be used to cool this inert gas, in order to provide an additional cooling effect on the polymer resin (not shown). Cooling jackets or another cooling mechanism could also be used on any of the resin conveying lines, for example, anywhere on flow line 10 and/or flow line 25, to further cool the resin while it is being transferred and/or re-circulated.

At least a portion of the polymer resin in the seedbed container 20 may be re-circulated simultaneously with transfer of polymer resin via flow line 25. For re-circulation, polymer resin may be fed to flow line 25 via flow line 45. Valve 50 may be in flow line 45, for example, to regulate the flow of polymer resin from the seedbed container 20. The valve 50 may provide a continuous supply of the polymer resin or it may operate intermittently, thus providing a non-uniform feed of the polymer resin. The valve 50 may be, for example, a rotary valve, a screw feeder, a belt feeder, a vibrating feeder, or any other suitable mechanism. In flow line 25, the polymer resin from the seedbed container 20 may be re-circulated with at least a portion of fresh polymer resin from flow line 15.

At least a portion of or all of the polymer resin from the seedbed container 20 may also be transferred to a polymerization reactor (not shown), for example, for use as a seedbed. From flow line 25, the polymer resin may be directed to the reactor via flow line 55. Valve 56 which may be, for example, a rotary valve, a screw feeder, a belt feeder, a vibrating feeder, or any other suitable mechanism, may be used to divert the at least a portion of or all of the polymer resin in flow line 25 to flow line 55 for transfer to the polymerization reactor. Polymer resin from the seedbed container 20 may also be transferred, for example, from the container to a polymer resin storage vessel (not shown), subsequently transferred to a surge vessel (not shown), and then subsequently transferred to an extrusion operation (not shown) or other downstream operation, such as a packaging operation (not shown). Polymer resin from the seedbed container 20 may also be transferred directly to a downstream operation without these intermediate steps.

One of ordinary skill in the art will appreciate that many variations are possible. For example, the process may comprise any of the following steps after transferring resin into the seedbed container 20, and these steps may take place in any order:

a. transferring resin from the seedbed container to a resin storage vessel;
b. transferring resin from the seedbed container to a resin surge vessel;
c. transferring resin from a resin storage vessel to a resin surge vessel;
d. transferring resin from a resin surge vessel to a resin storage vessel;
e. transferring resin from a resin storage vessel to a downstream operation; and
f. transferring resin from said resin surge vessel to a downstream operation.

For example, the process may comprise at least one of steps a through f above after transferring resin into the seedbed container 20, at least two of steps a through f above, at least three of steps a through f above, or at least four of steps a through f above, and the steps may be completed in any order.

As illustrated in FIG. 1, a control system 60 may be associated with the seedbed storage system 5. The control system 60 may be associated with the storage system such that it is used to control the operation of at least one valve in FIG. 1, or the operation of at least two valves, or the operation of at least three valves. The control system 60 may comprise a distributed control system. The distributed control system may be any of a variety of different control systems, and may, for example, comprise at least one controller selected from the group consisting of a multi-loop controller and a programmable logic controller. As illustrated in FIG. 1, the control system 60 may be coupled to the valve 10 via control line 65, to the pneumatic conveying equipment 35 via control line 70, and to the valve 50 via control line 75. Thus, when desired to transfer polymer resin to the seedbed container 20, the control system 60 may, for example, send a signal to the valve 10, thereby causing the valve 10, which may be a rotary valve, to feed the desired amount of polymer resin from flow line 15 into flow line 25. When desired to re-circulate polymer resin in the seedbed container 20 or transfer polymer resin from the seedbed container 20 to the polymerization reactor, the control system 60 may send a signal to the valve 50, thereby causing the valve 50, which may be a rotary valve, to feed the desired amount of polymer resin from the seedbed container into flow line 25. The control system 60 may also send a signal to the pneumatic conveying equipment 35, which may include a blower, to control the flow of nitrogen in flow line 25.

Figure 2:
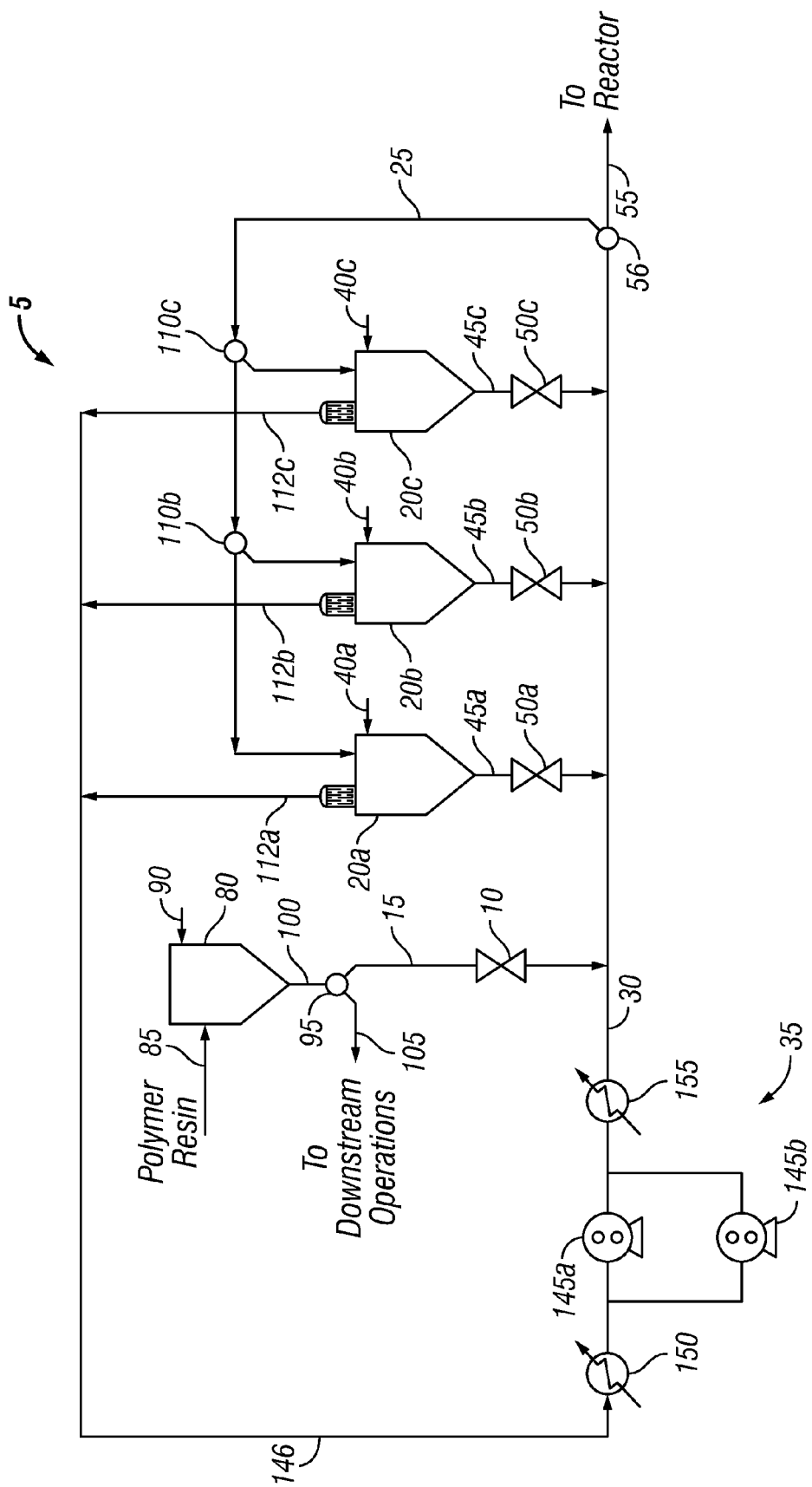
FIG. 2 is a schematic diagram illustrating another example of a seedbed storage system.

Referring now to FIG. 2, a seedbed storage system 5 having three seedbed storage containers 20a, 20b, 20c is shown. As illustrated, polymer resin may be fed to a vessel, such a resin surge vessel 80, via flow line 85. The resin surge vessel 80 may include a vent to atmosphere (not shown). The polymer resin may be stored in the resin surge vessel 80. The polymer resin may be stored in the resin surge vessel 80, for example, under a blanket or purge of an inert gas, such as nitrogen, which may be supplied via inert gas line 90. The resin surge vessel 80 may be used, for example, to enable a surge volume of polymer resin to be maintained for feeding downstream operations. For example, surge volume in the resin surge vessel 80 may compensate for short-term interruptions in supply of polymer resin from upstream operations, such as from the polymerization reactor or a product purge vessel (not shown). A volume of polymer resin in the resin surge vessel 80 may provide a continuous supply of polymer resin to downstream operations, allowing for upstream product transitions, downtime, or other events that may interrupt or necessitate stoppage of flow to the resin surge vessel 80.

As illustrated in FIG. 2, polymer resin may be removed from the resin surge vessel 80 and fed to valve 95 via flow line 100. The valve 95 may be, for example, a rotary valve, a screw feeder, a belt feeder, a vibrating feeder, or any other suitable mechanism. The valve 95 may direct all or a portion of the polymer resin in flow line 100 to downstream operations via flow line 105. Downstream operations may include one or more of extrusion operations, packaging operations, combination of the polymer resin with one or more additional additives to form compositions that can be used in articles of manufacture, and any combination thereof. The valve 95 may direct all or a portion of the polymer resin to the seedbed storage system 5 via flow line 15.

As illustrated in FIG. 2, flow line 15 may further comprise valve 10, which may be, for example, a rotary valve, a screw feeder, a belt feeder, a vibrating feeder, or any other suitable mechanism. The valve 10 may provide a continuous supply of the polymer resin or it may operate intermittently, thus providing a non-uniform feed of the polymer resin. From the valve 10, the polymer resin may be transferred to the seedbed containers 20a, 20b, 20c via flow line 25. As illustrated, valves 110b and 110c may be positioned in flow line 25. Valves 110b and 110c may operate to selectively transfer polymer resin in flow line 25 to the seedbed containers 20a, 20b, 20c. For example, embodiments may include operating the valves 110b and 110c in flow line 25 to separately transfer polymer resin to the seedbed containers 20a, 20b, 20c.

The polymer resin may be transferred to the seedbed containers 20a, 20b, 20c using a carrier fluid comprising an inert gas, such as nitrogen. The carrier fluid may be supplied via flow line 30 from pneumatic conveying equipment 35, which may include a blower, for example. The polymer resin may be stored in the seedbed containers 20a, 20b, 20c, for example, under a blanket or purge of an inert gas, such as nitrogen, which may be supplied via inert gas lines 40a, 40b, 40c. Cooling jackets or another cooling mechanism may be used to cool this inert gas, in order to provide an additional cooling effect on the polymer resin (not shown). Cooling jackets or another cooling mechanism could also be used on any of the resin conveying lines, for example, anywhere on flow line 10 and/or flow line 25, to further cool the resin while it is being transferred and/or re-circulated. The seedbed containers 20a, 20b, 20c may include vent lines 112a, 112b, 112c that may, for example, be coupled to gas return line 146 for returning inert gas from the seedbed containers 20a, 20b, 20c to the pneumatic conveying equipment 35. In the seedbed containers 20a, 20b, 20c, the polymer resin may be stored for subsequent use, for example, as a seedbed in a polymerization reactor (not shown).

At least a portion of the polymer resin in the seedbed containers 20a, 20b, 20c may be re-circulated simultaneously with transfer of polymer resin via flow line 25. Flow lines 45a, 45b, 45c may be used to withdraw polymer resin from one or more of the seedbed containers 20a, 20b, 20c with valves 50a, 50b, 50c regulating the flow of polymer resin from the seedbed containers 20a, 20b, 20c. Valves 50a, 50b, 50c may be, for example, rotary valves, screw feeders, belt feeders, vibrating feeders, or any other suitable mechanisms. The valves 50a, 50b, 50c may provide a continuous supply of the polymer resin or they may operate intermittently, thus providing a non-uniform feed of the polymer resin. In flow line 25, the polymer resin may be recirculated from the seedbed containers 20a, 20b, 20c with fresh polymer resin from flow line 15.

At least a portion of or all of the polymer resin from the seedbed container 20a, 20b, 20c may be transferred to a polymerization reactor (not shown), for example, for use as a seedbed. From flow line 25, the polymer resin may be directed to the reactor via flow line 55. Valve 56, which may be, for example, a rotary valve, a screw feeder, a belt feeder, a vibrating feeder, or any other suitable mechanism, may be used to divert the at least a portion of or all of the polymer resin in flow line 25 to flow line 55 for transfer to the polymerization reactor. Polymer resin from the seedbed containers 20a, 20b, 20c may also be transferred, for example, from the container to a polymer resin storage vessel (not shown), subsequently transferred to a surge vessel (not shown), and then subsequently transferred to an extrusion operation (not shown) or other downstream operation, such as a packaging operation (not shown). Polymer resin from the seedbed containers 20a, 20b, 20c may also be transferred directly to a downstream operation without these intermediate steps.

One of ordinary skill in the art will appreciate that many variations are possible. For example, the process may comprise any of the following steps after transferring resin into the seedbed containers 20a, 20b, 20c, and these steps may take place in any order:

a. transferring resin from the seedbed containers to a resin storage vessel;
b. transferring resin from the seedbed containers to a resin surge vessel;
c. transferring resin from a resin storage vessel to a resin surge vessel;
d. transferring resin from a resin surge vessel to a resin storage vessel;
e. transferring resin from a resin storage vessel to a downstream operation; and
f. transferring resin from said resin surge vessel to a downstream operation.

For example, the process may comprise at least one of steps a through f above after transferring resin into the seedbed containers 20a, 20b, 20c, at least two of steps a through f above, at least three of steps a through f above, or at least four of steps a through f above, and the steps may be completed in any order.

As illustrated in FIG. 2, the pneumatic conveying equipment may include blowers 145a and 145b. Inert gas in gas return line 146 from the seedbed containers 20a, 20b, 20c may be fed to the blowers 145a and 145b. The pneumatic conveying equipment 35 may also include inlet heat exchanger 150 for cooling gas fed to the blowers 145a and 145b and outlet heat exchanger 155 for cooling gas exiting the blowers 145a and 145b. One of ordinary skill in the art will appreciate that the pneumatic conveying equipment 35 may also include valves, filters, pressure sensors, and additional equipment not described in detail or illustrated herein.

As will be readily appreciated by one of ordinary skill in the art, the system as shown in FIG. 2 may also comprise a control system (not shown) associated with the seedbed storage system 5. The control system may be, for example, similar in setup and functionality to the control system described with respect to FIG. 1. For example, a control system may be associated with the storage system as shown in FIG. 2 such that it is used to control the operation of at least one valve in FIG. 2, or the operation of at least two valves, or the operation of at least three valves.

Polymerization Processes

As noted above, the systems and processes disclosed herein are useful generally for reducing the tendency of resins to sinter. One of ordinary skill in the art will recognize that these systems and processes may be usefully applied to many processes where the resins involved have the potential to sinter. Polymerization processes are described below to demonstrate the usefulness of the invention with respect to these processes, but such description should not be understood to be limiting.

Figure 3:
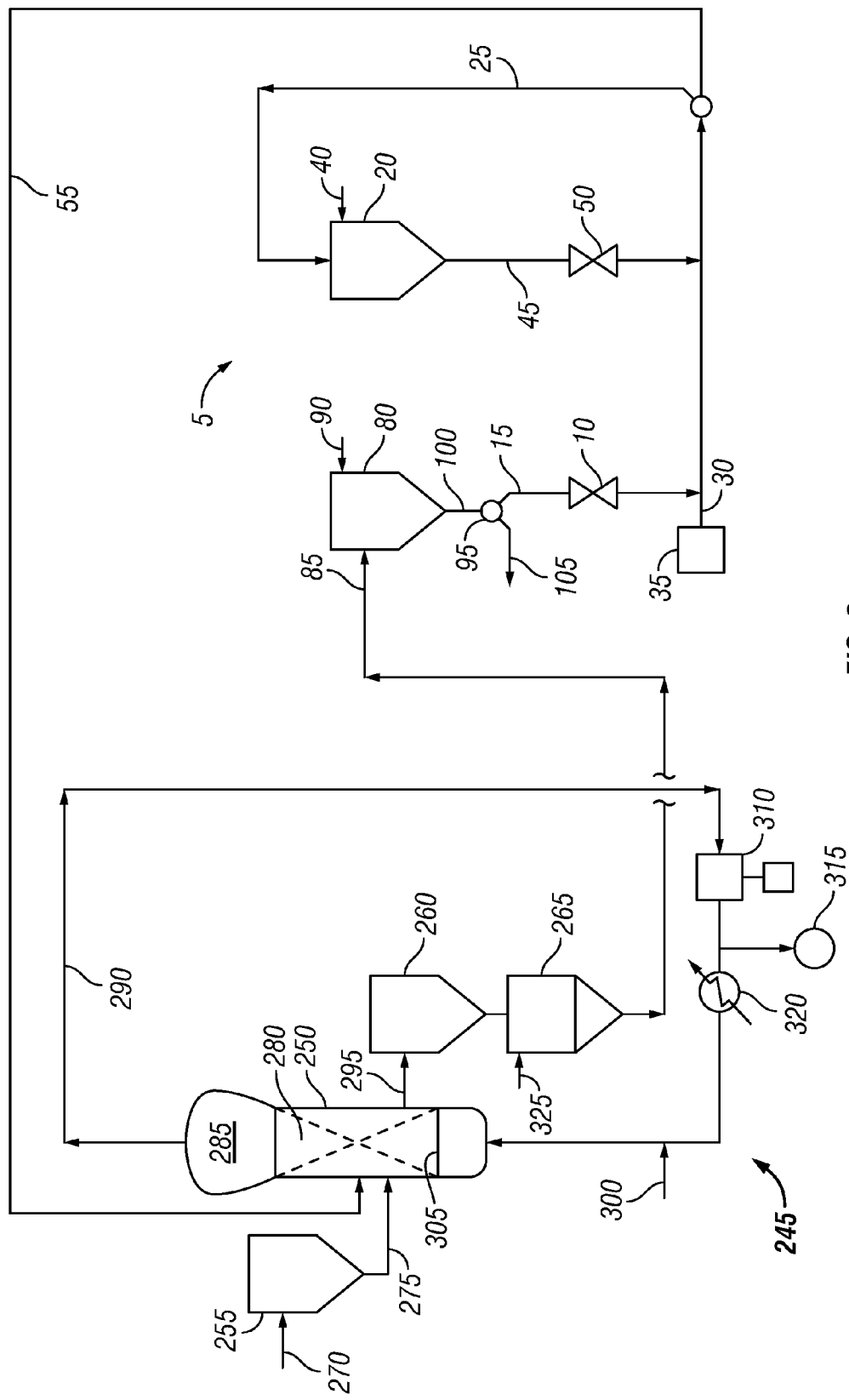
FIG. 3 is a schematic diagram illustrating an example polymerization process that includes a seedbed storage system.

Referring now to FIG. 3, an example of a polymerization system 245 with a seedbed storage system 5 is illustrated. In the illustrated embodiment, the polymerization system 245 includes a polymerization reactor 250, a catalyst vessel 255, a discharge vessel 260, a product purge vessel 265, resin surge vessel 80, and a seedbed container 20.

As illustrated, the polymerization system 245 includes a catalyst vessel 255 for containing catalyst. The catalyst vessel 255 may be any of a variety of different vessels suitable for feeding catalyst to the polymerization reactor 250. In some embodiments, the catalyst generally should be stored in the catalyst vessel 255 at a pressure higher than the polymerization reactor 250 to facilitate transport of the catalyst to the polymerization reactor 250. The catalyst may be stored in the catalyst vessel 255, for example, under a blanket of an inert gas, such as nitrogen, which may be supplied via inert gas line 270. In some embodiments, the catalyst vessel 255 is a dry catalyst feeder vessel. Any type of polymerization catalyst may be used, including liquid-form catalysts, solid catalysts, and heterogeneous or supported catalysts, among others, and may be fed to the polymerization reactor 250 as a solution, a slurry (liquid/solid mixture), or as a solid. Examples of suitable catalysts will be described in more detail below.

The catalyst may be transported from the catalyst vessel 255 through catalyst injection line 275 and into the polymerization reactor 250. As illustrated, polymerization reactor 250 includes a reaction zone 280 and a velocity-reduction zone 285. The reaction zone 280 includes a fluidized bed comprising growing polymer particles, formed polymer particles, and small amounts of catalyst, fluidized by the continuous flow of fluid fed to the polymerization reactor 250 via recycle line 290. The polymer product may be removed from the reaction zone 280 via product line 295. As illustrated, feed to the polymerization reactor 250 via recycle line 290 may contain both make-up fluid (e.g., fresh monomer and/or comonomer) from make-up line 300 and recycled fluid from the polymerization reactor 250. The feed stream may enter the polymerization reactor 250 via recycle line 290 through a distributor plate 305 at the bottom of the reaction zone 280. The distributor plate 305 may aid in uniform distribution of the feed stream and also support the solid particles of the fluidized bed when the feed stream is off. Fluidization of the fluidized bed in the reaction zone 280 results, for example, from the high rate at which the feed stream flows into and through the polymerization reactor 250. The high rate of the feed stream flow allows for the stream to suspend and mix the fluidized bed in the reaction zone 280 in a fluidized state.

The feed stream passes upward through the reaction zone 280, absorbing heat generated by the polymerization process. The portion of the feed stream that does not react in the reaction zone 280 leaves the reaction zone 280 and passes through the velocity-reduction zone 285. In the velocity-reduction zone 285, most polymer particles entrained within the feed stream drop back down into the reaction zone 280, thereby reducing the amount of polymer particles that may exit the polymerization reactor 250 via recycle line 290. In some embodiments, after exiting the polymerization reactor 250, a compressor 310 may compress fluid in recycle line 290. As illustrated, a gas analyzer 315 may be used to analyze samples from the recycle line 290 prior to its return to the polymerization reactor 250. In some embodiments, after compression, the stream may flow through heat exchanger 320 via recycle line 290, to remove the heat generated by the polymerization process and cool the recycled stream. In other embodiments, the stream may flow through a heat exchanger, a liquid separation process, and be re-injected into the polymerization reactor as a liquid or partial-liquid (embodiment not shown).

The polymer resin product may exit the polymerization reactor 250 via product line 295. The polymer resin product may be fed into discharge vessel 260 and then into product purge vessel 265. In the product purge vessel 265, an inert gas such as nitrogen and/or steam may be introduced via gas line 325, for example, to remove reactants and terminate/prevent any continuing polymerization. From the product purge vessel 265, the product polymer resin may be fed to the resin surge vessel 80 via flow line 85 and then fed to the seedbed container 20. Transfer of the polymer resin to the seedbed container 20 may be accomplished using the previously described techniques, for example. As desired, at least a portion of the polymer resin from the seedbed container 20 may be transferred to the polymerization reactor 250 via flow line 55.

While the preceding discussion of polymerization reactor 250 is directed to a fluidized-bed reactor for gas-phase polymerization, the present invention is not limited to any particular type of reactor. The resin storage systems described herein may be used with any suitable process for the polymerization of olefins, such as ethylene or propylene, including any suspension, solution, slurry, or gas phase process, using known equipment and reaction conditions. The polymerization process may be conducted over a wide range of temperatures and pressures. The temperatures, for example, may be in the range of from about 50° C. to about 280° C. In some embodiments, the temperature may be range from about 60° C. to about 280° C., or from about 50° C. to about 200° C., from about 60° C. to about 120° C., or from about 70° C. to about 100° C., or from about 80° C. to about 95° C., wherein a desirable temperature range may include any combination of any upper limit with any lower limit described herein. In some embodiments, the reactor temperature may vary, for example, from about 30° C. to about 120° C., or from about 60° C. to about 115° C., or from about 70° C. to about 110° C., or from about 70° C. to about 95° C.

In general, the polymerization process may be a continuous gas-phase process, such as a fluidized-bed process. A fluidized-bed reactor may have a reaction zone and a velocity-reduction zone (i.e., disengagement zone). The reaction zone includes a bed of growing polymer particles, formed polymer particles, and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Makeup of gaseous monomer to the circulating gas stream is at a rate equal to the rate at which particulate polymer product and monomer associated therewith is withdrawn from the reactor, and the composition of the gas passing through the reactor is adjusted to maintain an essentially steady state gaseous composition within the reaction zone. The gas leaving the reaction zone is passed to the velocity-reduction zone where entrained particles are removed. Finer entrained particles and dust may be removed in a cyclone and/or fines filter. The gas is passed through a heat exchanger wherein the heat of polymerization is removed, compressed in a compressor and then returned to the reaction zone.

Useful gas-phase polymerization processes are described in, for example, U.S. Pat. Nos. 3,709,853, 4,003,712, 4,011,382, 4,302,566, 4,543,399, 4,882,400, 5,352,749, and 5,541,270, as well as European publication EP-A-0 802 202. These patents disclose gas-phase polymerization processes wherein the polymerization medium is either mechanically agitated or fluidized by the continuous flow of the gaseous monomer and diluent.

The process described herein is suitable for the production of homopolymers of olefins, including ethylene, and/or copolymers, terpolymers, and the like, of olefins, including polymers comprising ethylene and at least one or more other olefins. The olefins may be alpha-olefins. The olefins, for example, may contain from 2 to 16 carbon atoms in one embodiment. In other embodiments, ethylene and a comonomer comprising from 3 to 12 carbon atoms, or from 4 to 10 carbon atoms, or from 4 to 8 carbon atoms, may be used. In an embodiment, the olefin is a monomer selected from the group consisting of ethylene, propylene, and any combination thereof.

In embodiments, polyethylene may be prepared by the process disclosed herein. Such polyethylene may include homopolymers of ethylene and interpolymers of ethylene and at least one alpha-olefin wherein the ethylene content is at least about 50% by weight of the total monomers involved. Olefins that may be used as comonomers herein include, propylene, 1-butene, 1-pentene, 1-hexene, 1-heptene, 1-octene, 4-methylpent-1-ene, 1-decene, 1-dodecene, 1-hexadecene and the like. Also usable are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium.

The content of the alpha-olefin copolymer incorporated into the polymer may be no greater than 500 mol % in total, or may be from 0.1 to 20 mol %. The term "polyethylene" when used herein is used generically to refer to any or all of the polymers comprising ethylene described above.

In other embodiments, propylene-based polymers may be prepared by processes disclosed herein. Such propylene-based polymers may include homopolymers of propylene and interpolymers of propylene and at least one alpha-olefin, wherein the propylene content is at least about 50% by weight of the total monomers involved. Comonomers that may be used may include ethylene, 1-butene, 1-pentene, 1-hexene, 1-heptene, 1-octene, 4-methylpentene-1, 1-decene, 1-dodecene, 1-hexadecene and the like. Also useful are polyenes such as 1,3-hexadiene, 1,4-hexadiene, cyclopentadiene, dicyclopentadiene, 4-vinylcyclohexene-1, 1,5-cyclooctadiene, 5-vinylidene-2-norbornene and 5-vinyl-2-norbornene, and olefins formed in situ in the polymerization medium. In one embodiment, the content of the alpha-olefin comonomer incorporated into a propylene-based polymer may be no greater than 49 mol % in total, from 0.1 to 35 mol % in other embodiments.

Hydrogen gas is often used in olefin polymerization to control the final properties of the polyolefin. Increasing the concentration of hydrogen may increase the melt flow index (MFI) and/or melt index (MI) of the polyolefin generated. The MFI or MI can thus be influenced by the hydrogen concentration. The amount of hydrogen in the polymerization may be expressed as a mole ratio relative to the total polymerizable monomer, for example, ethylene, or a blend of ethylene and hexene or propylene. In an embodiment, the amount of hydrogen used in the polymerization processes is an amount sufficient to achieve the desired MFI or MI of the final polyolefin resin. Melt flow rate for polypropylene may be measured according to ASTM D 1238 (230° C. with 2.16 kg weight); melt index ($I_2$) for polyethylene may be measured according to ASTM D 1238 (190° C. with 2.16 kg weight).

Other gas-phase processes contemplated include series or multistage polymerization processes. For example, a staged reactor employing two or more reactors in series may be used, wherein one reactor may produce, for example, a high molecular weight component and another reactor may produce a low molecular weight component. In some embodiments, the polyolefin is produced using a staged gas phase reactor. Such polymerization systems are described in, for example, U.S. Pat. Nos. 5,627,242, 5,665,818, and 5,677,375, and European publications EP-A-0 794 200, EP-B1-0 649 992, EP-A-0 802 202, and EP-B-634 421.

In one embodiment, the one or more reactors in a gas-phase or fluidized-bed polymerization process may have a pressure ranging from about 0.7 to about 70 bar (about 10 to about 1,000 psia), or from about 14 to about 42 bar (about 200 to about 600 psia). In one embodiment, the one or more reactors may have a temperature ranging from about 10° C. to about 150° C., or from about 40° C. to about 125° C. In an embodiment, the reactor temperature may be operated at the highest feasible temperature taking into account the sintering temperature of the polymer within the reactor. In embodiments, the superficial gas velocity in the one or more reactors may range from about 0.2 to about 1.1 meters/second (about 0.7 to about 3.5 feet/second), or from about 0.3 to about 0.8 meters/second (about 1.0 to about 2.7 feet/second).

Some embodiments may be used with gas-phase polymerization systems, at superatmospheric pressures in the range from 0.07 to 68.9 bar (1 to 1,000 psig), from 3.45 to 27.6 bar (50 to 400 psig) in some embodiments, from 6.89 to 24.1 bar (100 to 350 psig) in other embodiments, and temperatures in the range from 30 to 130° C., or from 65 to 110° C., from 75 to 120° C. in other embodiments, or from 80 to 120° C. in further embodiments. In some embodiments, operating temperatures may be less than 112° C. In embodiments, stirred or fluidized-bed gas-phase polymerization systems may be used.

The polymerization process may be a continuous gas-phase process that includes the steps of: (a) introducing a recycle stream (including ethylene and alpha olefin monomers) into the reactor; (b) introducing the supported catalyst system; (c) withdrawing the recycle stream from the reactor; (d) cooling the recycle stream; (e) introducing into the reactor additional monomer(s) to replace the monomer(s) polymerized; (f) reintroducing the recycle stream or a portion thereof into the reactor; and (g) withdrawing a polymer product from the reactor.

Processes disclosed herein may optionally use inert particulate materials as fluidization aids. These inert particulate materials can include carbon black, silica, talc, and clays, as well as inert polymeric materials. Carbon black, for example, has a primary particle size of about 10 to about 100 nanometers, an average size of aggregate of about 0.1 to about 30 microns, and a specific surface area from about 30 to about 1500 $m^2$/g. Silica has a primary particle size of about 5 to about 50 nanometers, an average size of aggregate of about 0.1 to about 30 microns, and a specific surface area from about 50 to about 500 m$^2$/g. Clay, talc, and polymeric materials have an average particle size of about 0.01 to about 10 microns and a specific surface area of about 3 to 30 m$^2$/g. These inert particulate materials may be used in amounts ranging from about 0.3 to about 80%, or from about 5 to about 50%, based on the weight of the final product. They are especially useful for the polymerization of sticky polymers as disclosed in U.S. Pat. Nos. 4,994,534 and 5,304,588.

Chain transfer agents, promoters, scavenging agents and other additives may be, and often are, used in the polymerization processes disclosed herein. Chain transfer agents are often used to control polymer molecular weight. Examples of these compounds are hydrogen and metal alkyls of the general formula M$^x$R$_y$, where M is a Group 3-12 metal, x is the oxidation state of the metal, typically 1, 2, 3, 4, 5 or 6, each R is independently an alkyl or aryl, and y is 0, 1, 2, 3, 4, 5, or 6. In some embodiments, a zinc alkyl is used, such as diethyl zinc. Typical promoters may include halogenated hydrocarbons such as CHCl$_3$, CFCl$_3$, CH$_3$—CCl$_3$, CF$_2$Cl—CCl$_3$, and ethyltrichloroacetate. Such promoters are described in, for example, U.S. Pat. No. 4,988,783. Other organometallic compounds such as scavenging agents for poisons may also be used to increase catalyst activity. Examples of these compounds include metal alkyls, such as aluminum alkyls, for example, triisobutylaluminum. Some compounds may be used to neutralize static in the fluidized-bed reactor, others known as drivers rather than antistatic agents, may consistently force the static from positive to negative or from negative to positive. The use of these additives is well within the skill of those skilled in the art. These additives may be added to the circulation loops, riser, and/or downer separately or independently from the catalyst, or as part of the catalyst.

Continuity additives may also be used in the polymerization processes disclosed herein, for example, to control or potentially even eliminate reactor discontinuity events, which in general are a disruption in the continuous operation of a polymerization reactor. As used herein, the term "continuity additive or aid" and "antifoulant agent" refer to compounds or mixtures of compounds, such as solids or liquids, that are useful in gas-phase or slurry-phase polymerization processes to reduce or eliminate fouling of the reactor, where "fouling" may be manifested by any number of phenomena including sheeting of the reactor walls, plugging of inlet and outlet lines, formation of large agglomerates, or other forms of reactor upsets known in the art. For purposes here, the terms may be used interchangeably. In accordance with embodiments, the continuity additive may be used as a part of the catalyst system or introduced directly into the reactor independently of the catalyst system.

The specific continuity additive used may depend at least in part upon the nature of the static charge, the particular polymer being produced, and/or the particular catalyst being used. Non-limiting examples of continuity additives comprise fatty acid amines, amide-hydrocarbon or ethoxylated-amide compounds such as described as "surface modifiers" in WO 96/11961; polyethylenimines having the structure —(CH$_2$—CH$_2$—NH)$_n$—, where n can be from 10 to 10,000; polyetheramines; carboxylate compounds such as aryl-carboxylates and long chain hydrocarbon carboxylates, and fatty acid-metal complexes; alcohols, ethers, sulfate compounds, metal oxides and other compounds known in the art. Some specific examples of continuity additives include 1,2-diether organic compounds, magnesium oxide, ARMOSTAT 310, ATMER 163, ATMER AS-990, and other glycerol esters, IRGAST AS-990 and other ethoxylated amines (e.g., N,N-bis(2-hydroxyethyl)octadecylamine), alkyl sulfonates, and alkoxylated fatty acid esters; STADIS 450 and 425, KEROSTAT CE 4009 and KEROSTAT CE 5009, chromium N-oleylanthranilate salts, calcium salts of a Medialan acid and di-tert-butylphenol; POLYFLO 130, TOLAD 511 (a-olefin-acrylonitrile copolymer and polymeric polyamine), EDENOL D32, aluminum stearate, aluminum distearate, sorbitan-monooleate, glycerol monostearate, methyl toluate, dimethyl maleate, dimethyl furnarate, triethylamine, 3,3-diphenyl-3-(imidazol-1-yl)-propin, and like compounds. In some embodiments, the continuity additive may be a polyethyleneimine commercially available from BASF Corporation under the trade name LUPASOL. In some embodiments, the continuity additive may be a polyetheramine commercially available from Huntsman Corporation under the trade name JEFFAMINE. In some embodiments, the continuity additive is a metal carboxylate salt as described, optionally, with other compounds as described in this section. Any of the aforementioned continuity additives may be employed either alone or in combination as a continuity additive.

In embodiments, the reactors disclosed herein are capable of producing greater than 500 lbs of polymer resin per hour (227 kg/hr) to about 300,000 lbs/hr (136,000 kg/hr) or higher of polymer, greater than 1000 lbs/hr (455 kg/hr), greater than 10,000 lbs/hr (4540 kg/hr), greater than 25,000 lbs/hr (11,300 kg/hr), greater than 35,000 lbs/hr (15,900 kg/hr), greater than 50,000 lbs/hr (22,700 kg/hr), greater than 65,000 lbs/hr (29,000 kg/hr), or greater than 180,000 lbs/hr (81250 kg/hr).

The polymer resins produced can be used in a wide variety of products and end-use applications. The polymer resins may include, but are not limited to, linear low density polyethylene, low density polyethylenes, and high density polyethylenes, as well as polypropylenes of various densities. They include homopolymers, random copolymers, and impact copolymers.

The polymer resins, including ethylene- and propylene-based polymer resins, have a density, for example, in the range of from about 0.86 g/cm$^3$ to about 0.97 g/cm$^3$, from about 0.88 g/cm$^3$ to about 0.965 g/cm$^3$, or from about 0.900 g/cm$^3$ to about 0.96 g/cm$^3$.

The polymer resins produced by the process of the invention may have a molecular weight distribution, a weight average molecular weight to number average molecular weight (Mw/Mn), for example, of greater than 1.5 to about 15. In other embodiments, the polymer resins may have an Mw/Mn of greater than 2 to about 10 or greater than 2.2 to less than about 8.

The polymer resins of the present invention may have a melt index (MI) or (I$_2$) as measured by ASTM-D-1238-E (190° C./2.16 kg), for example, in the range from 0.01 dg/min to 1000 dg/min. In other embodiments, the polymers may have a melt index of from about 0.01 dg/min to about 100 dg/min or from about 0.1 dg/min to about 100 dg/min.

The polymer resins of the invention in an embodiment may have a melt index ratio (I$_{21}$/I$_{21}$) (I$_{21}$ is measured by ASTM-D-1238-F, [190° C./21.6 kg]), for example, of from 5 to 300. In other embodiments, the polymers may have a melt index ratio of from about 10 to less than 250, from 15 to 200, or from 20 to 180.

The polymer resins of the invention may be blended and/or coextruded with any other polymer. Non-limiting examples of other polymer resins include linear low density polyethylenes produced via conventional and/or single-site catalysis, elastomers, plastomers, high pressure low density polyethylene, high density polyethylenes, polypropylenes, and the like.

Polymer resins produced by the process of the invention and blends thereof are useful in such forming operations as film, pipe, sheet, and fiber extrusion and co-extrusion as well as blow molding, injection molding and rotary molding. Films include blown or cast films formed by coextrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications. Fibers may include, are not limited to, melt spinning, solution spinning and melt blown fiber operations for use in woven or non-woven form to make filters, diaper fabrics, medical garments, geotextiles, etc. Extruded articles may include medical tubing, wire and cable coatings, geomembranes, and pond liners. Molded articles include single and multi-layered constructions in the form of bottles, tanks, large hollow articles, rigid food containers and toys, etc.

Catalyst System

Any type of catalyst component may be used in the polymerization processes described herein, including liquid-form catalysts, solid catalysts, and heterogeneous or supported catalysts, among others, and may be fed to the reactor as a liquid, slurry (liquid/solid mixture), or as a solid (typically gas transported). Liquid-form catalysts useful in embodiments disclosed herein should be stable and sprayable or atomizable. These catalysts may be used alone or in various combinations or mixtures. For example, one or more liquid catalysts, one or more solid catalysts, one or more supported catalysts, or a mixture of a liquid catalyst and/or a solid or supported catalyst, or a mixture of solid and supported catalysts may be used. These catalysts may be used with co-catalysts, activators, and/or promoters well known in the art. The term "catalyst component," as used herein, is used interchangeably with the term "catalyst," and includes any compound or component, or combination of compounds and components, that is capable of increasing the rate of a chemical reaction, such as the polymerization or oligomerization of one or more olefins.

Examples of Suitable Catalysts Include

Ziegler-Natta catalysts, including titanium-based catalysts, such as those described in U.S. Pat. Nos. 4,376,062 and 4,379,758. Ziegler-Natta catalysts are well known in the art, and typically are magnesium/titanium/electron donor complexes used in conjunction with an organoaluminum co-catalyst.

Chromium-based catalysts, including those described in U.S. Pat. Nos. 3,709,853, 3,709,954, and 4,077,904, and others useful in the art.

Vanadium-based catalysts, such as vanadium oxychloride and vanadium acetylacetonate, including those described in U.S. Pat. No. 5,317,036, and others useful in the art.

Metallocene catalysts, including those described in U.S. Pat. Nos. 6,933,258 and 6,894,131, and others useful in the art.

Cationic forms of metal halides, such as aluminum trihalides.

Cobalt catalysts and mixtures thereof, including those described in U.S. Pat. Nos. 4,472,559 and 4,182,814, and others useful in the art.

Nickel catalysts and mixtures thereof, including those described in U.S. Pat. Nos. 4,155,880 and 4,102,817, and others useful in the art.

Rare Earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium trichloride), and allyl derivatives of such metals. In various embodiments, neodymium compounds, particularly neodymium neodecanoate, octanoate, and versatate, are particularly useful rare earth metal catalysts. Rare earth catalysts may be used, for example, to polymerize butadiene or isoprene.

Any combination of one or more of the catalysts of the above.

In one or more embodiments, a "mixed" catalyst system or "multi-catalyst" system may be used. A mixed catalyst system includes at least one metallocene catalyst component and at least one non-metallocene component. The mixed catalyst system may be described as a bimetallic catalyst composition or a multi-catalyst composition. As used herein, the terms "bimetallic catalyst composition" and "bimetallic catalyst" include any composition, mixture, or system that includes two or more different catalyst components, each having the same or different metal group but having at least one different catalyst component, for example, a different ligand or general catalyst structure. Examples of useful bimetallic catalysts can be found in U.S. Pat. Nos. 6,271,325, 6,300,438, and 6,417,304. The terms "multi-catalyst composition" and "multi-catalyst" include any composition, mixture, or system that includes two or more different catalyst components regardless of the metals. Therefore, terms "bimetallic catalyst composition," "bimetallic catalyst," "multi-catalyst composition," and "multi-catalyst" will be collectively referred to herein as a "mixed catalyst system" unless specifically noted otherwise.

The catalyst system may comprise one or more activators. An activator (also known as a cocatalyst) is defined as any combination of reagents that increases the rate at which a catalyst oligomerizes or polymerizes unsaturated monomers, such as olefins.

In one embodiment, alumoxanes activators may be utilized as an activator in the catalyst composition. Alumoxanes are generally oligomeric compounds containing —Al(R)—O— subunits, where R is an alkyl group. Examples of alumoxanes include methylalumoxane (MAO), modified methylalumoxane (MMAO), ethylalumoxane and isobutylalumoxane. Alkylalumoxanes and modified alkylalumoxanes are suitable as catalyst activators, particularly when the abstractable ligand is a halide. Mixtures of different alumoxanes and modified alumoxanes may also be used. For further descriptions, see U.S. Pat. Nos. 4,665,208, 4,952,540, 5,041,584, 5,091,352, 5,206,199, 5,204,419, 4,874,734, 4,924,018, 4,908,463, 4,968,827, 5,329,032, 5,248,801, 5,235,081, 5,157,137, 5,103,031 and EP 0 561 476 A1, EP 0 279 586 B1, EP 0 516 476 A, EP 0 594 218 A1 and WO 94/10180.

Aluminum alkyl or organoaluminum compounds may also be utilized as activators (or scavengers), including trimethylaluminum, triethylaluminum, triisobutylaluminum, tri-n-hexylaluminum, tri-n-octylaluminum and the like.

Ionizing or stoichiometric activators, neutral or ionic, such as tri (n-butyl) ammonium tetrakis (pentafluorophenyl) boron, a trisperfluorophenyl boron metalloid precursor or a trisperfluoronaphtyl boron metalloid precursor, polyhalogenated heteroborane anions (see, WO 98/43983), boric acid (see, U.S. Pat. No. 5,942,459) or a combination thereof, may also be used. Neutral or ionic activators may be used alone or in combination with alumoxane or modified alumoxane activators.

Examples of neutral stoichiometric activators may include tri-substituted boron, tellurium, aluminum, gallium and indium or mixtures thereof. The three substituent groups may be each independently selected from the group of alkyls, alkenyls, halogen, substituted alkyls, aryls, arylhalides, alkoxy and halides. In other embodiments, the three groups are halogenated, preferably fluorinated, aryl groups. In some embodiments, the neutral stoichiometric activator is selected from trisperfluorophenyl boron or trisperfluoronapthyl boron.

Exemplary ionic stoichiometric activator compounds are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198, 401, 5,066,741, 5,206,197, 5,241,025, 5,384,299 and 5,502, 124.

The described catalysts or catalyst systems, as noted above, may also be combined with one or more support materials or carriers. For example, in some embodiments, the activator is contacted with a support to form a supported activator wherein the activator is deposited on, contacted with, vaporized with, bonded to, or incorporated within, adsorbed or absorbed in, or on, a support or carrier. Any suitable material or method in the art for forming a supported catalyst may be used.

While compositions, methods, and processes are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used. In the preceding description and the appended claims, the singular forms "a," "an" and "the" include plural referents unless otherwise specified.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited; in the same way, ranges from any upper limit may be combined with any other upper limit to recite a range not explicitly recited.

All documents and references cited herein, including testing procedures, publications, patents, journal articles, etc. are herein fully incorporated by reference for all jurisdictions in which such incorporation is permitted and to the extent such disclosure is consistent with the description of the present invention.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Although individual embodiments are discussed, the invention covers all combinations of all those embodiments.

What is claimed is:

1. A process for storing resin, comprising transferring resin into a container via a flow line using a carrier fluid, wherein the carrier fluid comprises an inert gas; re-circulating at least a portion of the resin in said container by withdrawing resin from said container and feeding said withdrawn resin into said flow line, wherein said re-circulating occurs simultaneously with said transferring; and wherein said transferring and said re-circulating is such that the resin is cooled, and wherein said container is a seedbed container for a gas-phase polymerization process and is sized for in the range of about 1 to about 3 hours of surge capacity.

2. The process of claim 1, wherein said transferring and said re-circulating is such that the resin is cooled to a temperature of about 50° C. or less.

3. The process of claim 1, wherein said re-circulating is continued after said container is at least 90 volume % full.

4. The process of claim 1, wherein said transferring comprises using a pneumatic conveying system.

5. The process of claim 4, wherein said pneumatic conveying system comprises a dense-phase system.

6. The process of claim 4, wherein said pneumatic conveying system comprises a dilute-phase system.

7. The process of claim 1, wherein resin is stored in said container in the presence of an inert gas, wherein the inert gas is provided to the container in an open-loop system.

8. The process of claim 1, wherein resin is stored in said container in the presence of an inert gas, wherein the inert gas is provided to the container in a closed-loop system.

9. The process of claim 1, wherein a weight ratio of said re-circulated resin to said withdrawn resin in said flow line is from about 1:10 to about 20:1.

10. The process of claim 1, wherein a control system is associated with the process and used to control the operation of at least one valve.

11. The process of claim 1, further comprising any of the following steps, after said transferring of resin into said container:
 a. transferring resin from said container to a resin storage vessel;
 b. transferring resin from said container to a resin surge vessel;
 c. transferring resin from a resin storage vessel to a resin surge vessel;
 d. transferring resin from a resin surge vessel to a resin storage vessel;
 e. transferring resin from a resin storage vessel to a downstream operation; and
 f. transferring resin from said resin surge vessel to a downstream operation.

12. A polymerization process comprising polymerizing an olefin in a reactor in the presence of a catalyst to produce a polymer resin, wherein at least a portion of said resin is stored according to the process of claim 1.

13. The polymerization process of claim 12, wherein the polymerization process is a gas-phase process in a fluidized-bed reactor.

14. A resin storage system comprising:
 a. a container, wherein said container is a seedbed container for a gas-phase polymerization process and is sized for in the range of about 1 to about 3 hours of surge capacity;
 b. a resin surge vessel in fluid communication with the container;
 c. a control system configured to send signals to cause transfer of resin from said resin surge vessel to said container and simultaneously re-circulate at least a portion of the resin from said container to said container; and d. a single pneumatic conveying system configured to supply inert gas, wherein said transfer of resin and said re-circulating of resin use a common flow line and the single pneumatic conveying system to supply inert gas for said transfer of resin and said re-circulation of resin, and wherein said transfer of resin and said re-circulating of resin is such that the resin is cooled.

15. The resin storage system of claim 14, wherein said pneumatic conveying system comprises a dense-phase system.

16. The resin storage system of claim 14, wherein said pneumatic conveying system comprises a dilute-phase system.

17. The resin storage system claim 14, wherein the control system comprises a distributed control system comprising at least one controller selected from the group consisting of a multi-loop controller and a programmable logic controller.

\* \* \* \* \*